United States Patent [19]

Dieffenbacher et al.

[11] 3,710,432

[45] Jan. 16, 1973

[54] METHOD FOR REMOVING A METALIZED DEVICE FROM A SURFACE

[75] Inventors: George W. Dieffenbacher, Fairfield; Harold E. Hadcock, Sauquoit, both of N.Y.

[73] Assignee: General Electric Company

[22] Filed: March 30, 1971

[21] Appl. No.: 129,398

[52] U.S. Cl. ........................29/426, 29/401, 29/427, 29/480, 29/481

[51] Int. Cl. ..........................................B23p 19/00

[58] Field of Search........29/576, 624, 401, 426, 526, 29/470, 471.1, 471.7, 427, 472.9, 481

[56] References Cited

UNITED STATES PATENTS

| | | | |
|---|---|---|---|
| 2,337,058 | 12/1943 | McKee | 29/426 |
| 2,441,353 | 5/1948 | Gosmann et al | 29/426 |
| 3,140,890 | 7/1964 | Schwartz | 294/1 R |
| 3,211,354 | 10/1965 | Dugard et al. | 29/426 X |
| 3,466,732 | 9/1969 | Taylor, Jr. | 29/401 X |
| 3,611,744 | 10/1971 | Sutz | 294/1 R X |
| 3,617,682 | 11/1971 | Hall | 29/471.1 X |

*Primary Examiner*—J. Spencer Overholser
*Assistant Examiner*—Richard Bernard Lazarus
*Attorney*—Robert P. Cogan, Irving M. Freedman, Joseph B. Forman, Frank L. Neuhauser and Oscar B. Waddell

[57] ABSTRACT

Means and method for removing a metalized device bonded to a substrate from the substrate. A tool having a surface consisting of a metal having an affinity for the metalization of the metalized device is brought into engagement with the device. The tool is bonded to the device and heat is provided to exceed the eutectic point of the bond between the device and substrate. After bonding, the tool and device bonded thereto are removed from the substrate. The device may afterward be removed from the tool in any convenient manner.

4 Claims, 4 Drawing Figures

INVENTORS:
GEORGE W. DIEFFENBACHER,
HAROLD E. HADCOCK,
BY Robert P. Cogan
THEIR ATTORNEY.

METHOD FOR REMOVING A METALIZED DEVICE FROM A SURFACE

BACKGROUND OF THE INVENTION

This invention relates to means and processesses utilized in the fabrication of hybrid electronic microcircuits, and more particularly to the removal of a metalized device from a substrate.

In the manufacture of hybrid microelectronic circuits, a plurality of circuit units are placed on a substrate. These circuit units are metalized devices, or "chips", each containing portions of the system to be included in the larger hybrid circuit. The chips generally comprise noble metals deposited on semiconductor wafers. In the manufacture of a hybrid circuit, a defective chip may be found in the system. Removal and replacement of the chip may preclude the need for discarding the entire circuit.

In the past, several techniques have been utilized for removal of defective chips. One is heating the bond of the chip to the substrate and removing it by hand with a gripping device such as pointed tweezers. The chip has also been lifted with a vacuum device. Another alternative method is contacting and gripping the chip with heating electrodes and lifting the chip with the electrodes after the bond of the chip to the substrate is melted. Difficulty and inconvenience arises in each of these techniques due to the problem presented by the surface tension of the melted bond. This problem limits the ability to remove the chip from the pad by the above techniques. In addition, in each of the above techniques, proper alignment of the lifting device with the chip is time consuming.

SUMMARY OF THE INVENTION

It is therefore an object of the present invention to provide a method and means for removing a chip from a substrate in a simplified manner.

It is also an object of the present invention to provide a method and means for removing a chip from a substrate in which difficulty in handling of the chip due to surface tension of the melted bond between the substrate and the chip is minimized.

It is also an object of the present invention to provide a means of the type described which is capable of removing a bonded chip from a substrate without damage to the remainder of a hybrid microcircuit.

It is yet another object of the present invention to provide a means of the type described which is extremely simple in construction.

It is still another object of the present invention to provide a method and means of the type described requiring a minimum of operator skill.

Briefly stated, in accordance with the present invention, there is provided a method and means for removing a metalized device bonded to a substrate from the substrate. A surface of a tool is brought into chemically clean contact with the metalization on a substrate. The tool surface consists of a metal having an affinity for the metalization on the device. Heating means are provided to heat the surface, device and bond so that the bond is melted and the device is bonded to the surface of the tool. Means are provided to lift the tool and device bonded thereto from the substrate. The device may then be removed from the tip by any convenient means.

BRIEF DESCRIPTION OF THE DRAWINGS

The means and method through which the foregoing objects are achieved are pointed out with particularity in the claims forming the concluding portion of the specification. The invention, both as to its organization and manner of operation may be further understood by reference to the following drawings taken in connection with the following description.

Of the drawings.

DESCRIPTION OF THE PREFERRED EMBODIMENTS

Figure 1:
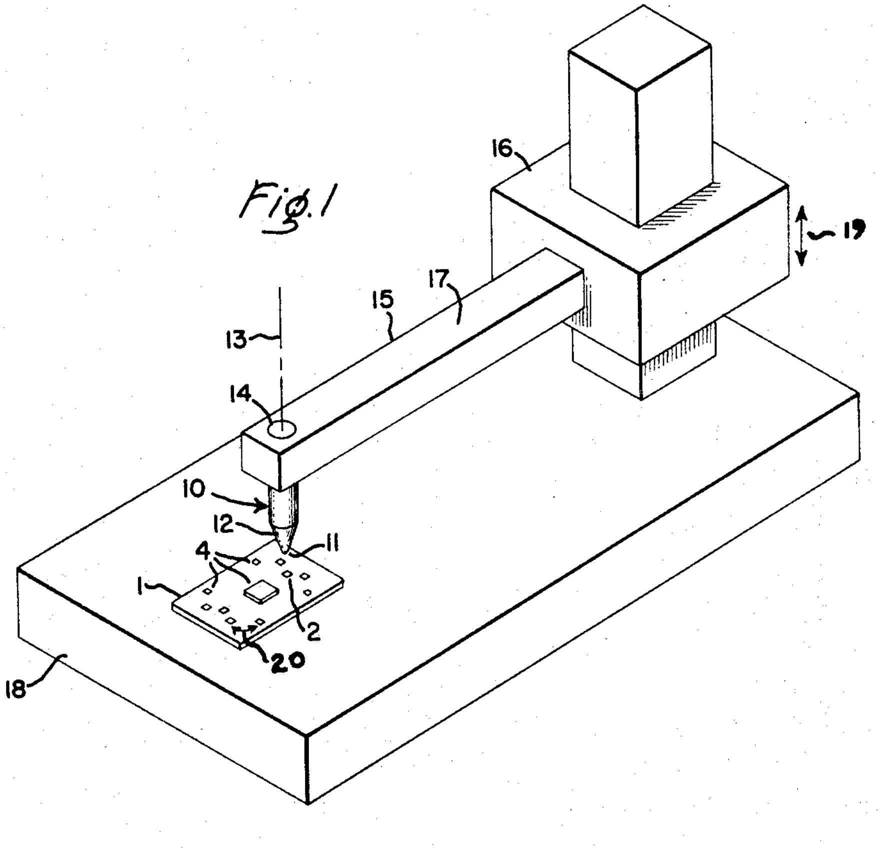
FIG. 1 is an illustration of apparatus incorporating the present invention and of a metalized device, or chip, bonded to a substrate.

Referring to FIG. 1, there is illustrated an apparatus constructed in accordance with the present invention for operating on a metalized device 2 having metalization 3 and which is bonded to a substrate 1. The metalized device 2 may, for example, comprise a device such as a diode or an entire integrated circuit. The device may be as small as thousandths of an inch square. The metalization 3 generally consists of noble metals such as aluminum or gold. For ease in reference, the metalized device 2 will be referred to by its common terminalogy in the art, the chip 2. The chip 2 which commonly comprises silicon, is bonded to the substrate 1. Alumina, Ceramic or other substrates may be utilized. Many other chips are generally included on the substrate 1 to form when properly interconnected, a hybrid microcircuit.

The apparatus comprises a tool 10 having a surface 11 for contacting the chip 2. In the present embodiment, the tool 10 is cylindrically shaped and has a conical, tapered portion 12 which terminates in a surface 11 and also has an end portion 14 mechanically and thermally coupled to a tool holder 15. The tool holder 15 and tool 10 are mounted for motion along a longitudinal axis 13 of the tool 10. The tool holder 15 includes heating means 17. Mechanical means 16 are moveable as indicated by the arrow 19 provided for selectively moving the tool 10, and hence the surface 11, into and out of engagement with the chip 2. A base 18 is provided for supporting the substrate 1 and may also include further heating means (not shown).

Figure 2:
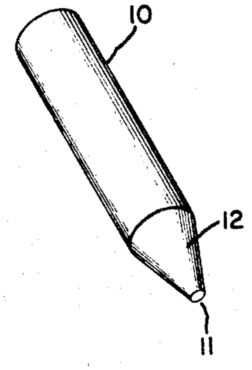
FIG. 2 is an illustration of a tool constructed in accordance with the present invention.

Referring now to FIG. 2, the tool 10 must be heat conductive to couple heat to the surface 11 from a heat source such as the heat source 17. The surface 11 consists of a metal having an affinity for the metalization 3 on the chip 2. More particularly, in the preferred embodiment, the surface 11 consists of a noble metal such as aluminum, silver, or gold. A noble metal is used because it is non-oxidizeable and bonds to the metalization 3 of the chip 2 without the use of a flux. Other nonferrous metals may be used. Ferrous metals, however, require the use of a flux in the bonding process. It is desirable to avoid the use of a flux since it can cause undesired etching in other chips 4 bonded on the substrate 1.

Since it is desired to bond the surface 11 to the chip 2, the surface 11 must be of sufficient thickness to produce a bond. Such a thickness is at least thirty millionths of an inch. The surface area of the surface 11 is chosen to be of sufficient magnitude so that the bond between the surface 11 and chip 2 is of sufficient strength to pull the chip 2 away from the substrate 1 and overcome the surface tension of the bond therebetween. Preferably, the size of the portion of the tool 10, i.e., the surface 11, brought into engagement with the chip 2 should be about the same size or smaller than the chip 2 to facilitate ease of removing the chip 2 from the tool 10 after completion of the operation of the apparatus. This facilitates removal of the chip 2 even though there may be many other chips 4 surrounding it.

Most conveniently, the entire tool 10 may be constructed of aluminum. The aluminum must be of sufficient purity to provide a bond of sufficient strength between the surface 11 and chip 2. It has been found that a purity of at least 96 percent is adequate. Alternatively, a surface 11 may be provided of the above-specified thickness or greater consisting of a noble metal, e.g., gold, the remainder of the tool 10 consisting of another heat conducting metal.

Figure 3:
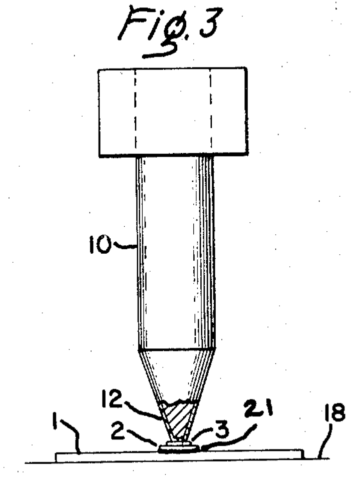
FIG. 3 is an illustration of the heating and bonding stage of the operation of the present invention.

In operation the mechanical means 16 are operated to bring the tool 10 into an engagement with the chip 2. More specifically, the surface 11 of the tool 10 is brought into engagement with the metalization 3 on the chip 2, as shown in FIG. 3, since the tool 10 consists of a single element, its alignment with the chip 2 is a simple operation. The surface must be brought into chemically clean engagement with the chip 2. In other words, the area over which the surface will contact the chip 2 must be sufficiently free of impurities to permit bonding. If the operation is performed in a vacuum or inert atmosphere such as nitrogen, no step beyond bringing the surface 11 and chip 2 into mechanical engagement is necessary. Where the operation is performed in a conventional atmosphere, it may be necessary to provide a slight scraping of the chip 2 against the surface 11. This may be accomplished, for example, by moving the substrate 1 in the direction of the arrow 20 of FIG. 1.

The heating means 17 in the tool holder 15 and in the base 18 are utilized to provide sufficient heat to bond the chip to the surface 12 on the tool 10 and then to melt the bond between the chip 2 and substrate 1. In a typical case, the metalization of the chip 2 consists of gold and the substrate 1 consists of silicon. In this case, the eutectic point of the bond is 372°C. The bond must be heated to a higher temperature, preferably at least 380°C. In FIG. 3, the bond is shown in an exaggerated scale and in a liquid state and is denoted by the reference numeral 21.

Figure 4:
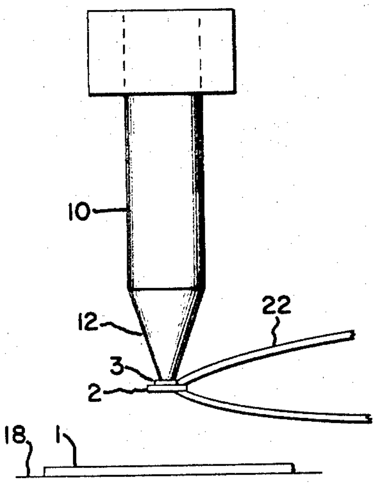
FIG. 4 is an illustration of the present invention at the completion of operation.

AS illustrated in FIG. 4, once the chip 2 is bonded to the surface 11 and the bond 21 is melted, the mechanical means 16 lift the chip 2 and tool 10 out of engagement with the substrate 1. The bond between the chip 2 and surface 12 of the tool 10 is of sufficient strength to overcome the surface tension of the bond 21. After removal, the chip 2 may be discarded by any convenient means, for example, by the use of a pair of tweezers 22. Such operation is preferable to prior methods since the possibility of the operator's damaging the remainder of a hybrid circuit through imprudent use of the tweezers 22 is eliminated.

The subject method and apparatus are useful for removing defective chips from both bare substrates and substrates mounted in packaged enclosures.

Of course, other metals than those specifically mentioned may be used in the construction of the tool 10. Other metals to be used may be determined from the above teachings of the disclosure. The shape of the tool 10 may be changed, and the heating means such as those included in the tool holder 15 and base 18 may be positioned elsewhere. Thus the disclosure should suggest many forms which the present invention could take which are not specifically pointed out in FIGS. 1, 2, 3, and 4.

What is claimed as new and desired to be secured by Letters Patent of the United States is:

1. A method for removing a metalized chip bonded to a substrate from the substrate comprising the steps of bonding a metal tool to the chip, raising the temperature of the bond between the chip and the substrate to a temperature in excess of its eutectic point, and removing the tool and chip bonded thereto from said substrate.

2. A method according to claim 1 further comprising the step of breaking the bonded chip away from the tool.

3. A method for removing a metalized chip bonded to a surface comprising the steps of bonding a metal tool to the chip, loosening the bond between the chip and the surface, and removing the tool and chip bonded thereto from the surface.

4. A method for removing a metalized chip bonded to a substrate from the substrate consisting of the steps of bringing a surface consisting of a metal having an affinity for the metalization of the chip into chemically clean engagement with the chip, heating the surface, chip, and substrate to a temperature sufficient to bond the chip to the surface and sufficient to exceed the eutectic point of the bond between the chip and the substrate, bonding the chip to the surface, and removing the surface and chip from the substrate.

* * * * *